United States Patent
Ghani (10) Patent No.: US 12,442,563 B2
(45) Date of Patent: Oct. 14, 2025

(54) SOLAR THERMAL COLLECTOR

(71) Applicant: Heriot-Watt University, Edinburgh (GB)

(72) Inventor: Faisal Ghani, Dundee (GB)

(73) Assignee: Heriot-Watt University, Edinburgh (GB)

(*) Notice: Subject to any disclaimer, the term of this patent is extended or adjusted under 35 U.S.C. 154(b) by 524 days.

(21) Appl. No.: 17/619,800

(22) PCT Filed: Jun. 19, 2020

(86) PCT No.: PCT/GB2020/051490
§ 371 (c)(1),
(2) Date: Dec. 16, 2021

(87) PCT Pub. No.: WO2020/254822
PCT Pub. Date: Dec. 24, 2020

(65) Prior Publication Data
US 2022/0307727 A1 Sep. 29, 2022

(30) Foreign Application Priority Data
Jun. 20, 2019 (GB) .................................. 1908889

(51) Int. Cl.
F24S 10/70 (2018.01)
F24S 20/50 (2018.01)
F24S 80/453 (2018.01)
F24S 80/457 (2018.01)
F24S 80/50 (2018.01)

(52) U.S. Cl.
CPC ............ *F24S 10/746* (2018.05); *F24S 10/73* (2018.05); *F24S 20/50* (2018.05); *F24S 80/453* (2018.05); *F24S 80/457* (2018.05); *F24S 2080/502* (2018.05)

(58) Field of Classification Search
None
See application file for complete search history.

(56) References Cited

U.S. PATENT DOCUMENTS

| 2,167,576 A | * | 7/1939 | Kiser | ..................... F24S 10/755 |
| | | | | 126/610 |
| 3,822,692 A | * | 7/1974 | Demarest | ................. F24S 20/40 |
| | | | | 60/641.15 |

(Continued)

FOREIGN PATENT DOCUMENTS

| CA | 2150750 A1 | 12/1996 |
| DE | 910096 U1 * | 3/1991 |

(Continued)

OTHER PUBLICATIONS

Machine Translation DE9100096U1 (Year: 2024).*

(Continued)

*Primary Examiner* — Edelmira Bosques
*Assistant Examiner* — Deepak A Deean
(74) *Attorney, Agent, or Firm* — Stinson LLP (57) ABSTRACT

A solar thermal collector adapted to be assembled from a flat pack configuration, comprising a conduit (6) configured to carry fluid and to absorb radiation, a base (1) above which the conduit (6) is mounted and a plurality of panels configured to interconnect with the base (1) to produce a housing (8) for the conduit (6).

19 Claims, 5 Drawing Sheets

(56) References Cited

U.S. PATENT DOCUMENTS

| | | | | |
|---|---|---|---|---|
| 4,086,911 A | * | 5/1978 | Futch | F24S 60/30 |
| | | | | 126/647 |
| 4,149,525 A | * | 4/1979 | Prado | F24S 10/40 |
| | | | | 126/654 |
| 4,184,481 A | * | 1/1980 | Tornquist | F24S 10/755 |
| | | | | 126/658 |
| 4,267,826 A | | 5/1981 | Hitt, Jr. | |
| 4,458,671 A | * | 7/1984 | Everett | F24S 60/30 |
| | | | | 126/705 |
| 4,756,300 A | * | 7/1988 | Ewers | F24S 10/17 |
| | | | | 126/567 |
| 4,964,395 A | * | 10/1990 | Salgado | F24S 70/60 |
| | | | | 126/592 |

FOREIGN PATENT DOCUMENTS

| | | | | |
|---|---|---|---|---|
| DE | 9100096 | U1 | 3/1991 | |
| DE | 202010005345 | U1 | 9/2011 | |
| DE | 102013019871 | B3 | 1/2015 | |
| GB | 2462174 | A * | 2/2010 | F24J 2/045 |
| GB | 2585002 | A | 12/2020 | |
| JP | S57142442 | A | 9/1982 | |
| WO | WO-8100755 | A1 | 3/1981 | |
| WO | WO-2010013028 | A2 | 2/2010 | |

OTHER PUBLICATIONS

Moravej, Mojtaba, et al. "An Experimental Investigation of the Efficiency of a Stationary Helical Solar Water Heater", Current World Enviornment, vol. 12 No. (2) 2017, Jul. 10, 2017, pp. 250-257.

Mendão, João; International Search Report; PCT/GB2020/051490; Aug. 24, 2020; 3 pages.

* cited by examiner

SOLAR THERMAL COLLECTOR

FIELD OF THE INVENTION

The invention concerns flat pack solar thermal collectors and related systems, kits and methods.

BACKGROUND TO THE INVENTION

The generation of renewable heat is a significant global challenge, given that heat accounts for approximately 50% of total energy end use. As society shifts towards clean technologies to meet its energy needs, the demand for low cost renewable heat technologies continues to grow.

Examples of traditional solar thermal collectors that are commercially available include flat plate and evacuated tube collectors, which employ a material that absorbs solar radiation and convert it to heat. This heat energy is then transferred to a fluid and used to meet the customers' energy needs. However, these traditional solar thermal collectors have several drawbacks:
- they are designed for use on sloped roofs and have a flat plane, meaning their surface area is large and bulky;
- they are too heavy for use in developing countries (85% of the global population), as they have been designed to be supported on the type of housing and building constructions prevalent in the developed world;
- materials such as glass and metals are used, making shipping expensive because of the weight of these materials, with the glass elements susceptible to damage;
- they need to be installed at the optimal angle for their latitude;
- they are at risk of being destroyed in the event of frost/freezing, because any fluid inside the collector may freeze, expand, and destroy the collector's absorber;
- they are expensive due to the use of high performance/high cost materials such as tempered glass and copper.

Therefore, there is a need to address the decarbonisation of heat, with technologies that are relatively easily installed, light-weight, durable, easy to transport, resistant to damage from frost, cheap and simple to assemble, such that people living in both developed and developing countries may straightforwardly implement the technology.

It is an aim of example embodiments of the present invention to address one or more problems associated with traditional solar thermal collectors, whether identified herein, or otherwise.

SUMMARY OF THE INVENTION

According to a first aspect, there is provided a solar thermal collector adapted to be assembled from a flat pack configuration. The solar thermal collector comprises a conduit configured to carry fluid and to absorb radiation, a base above which the conduit is mounted and a plurality of panels configured to interconnect with the base to produce a housing for the conduit.

In one example, one or more of the panels is translucent. In one example, one or more of the panels is transparent. In one example, one or more of the panels is semi-transparent. In one example, one or more of the panels is partially transparent. In one example, one or more of the panels is mirrored. In one example, one or more of the panels is semi-silvered such that in use the reflective surface is internal of the housing.

In one example, the panels narrow from where they connect to the base. In one example, the panels progressively narrow from where they connect to the base. In one example, the panels are tapered.

In one example, one or more of the panels is triangular. In one example, one or more of the panels is substantially triangular.

In one example, all the panels are triangular. In one example, all the panels are substantially triangular.

In one example, the panels are interchangeable. In one example, the panels are identical with one another.

In one example, each of the panels rest on a first housing support plate. In one example, a second housing support plate caps the first housing support plate to clasp the panels in place. In one example the second housing support plate is transparent, semi-transparent, partially transparent or translucent. In one example, the first housing support plate and the second housing support plate are transparent, semi-transparent, partially transparent or translucent. In one example, the second housing support plate comprises clear UV stabilised polycarbonate. In one example, the first housing support plate and the second housing support plate comprise clear UV stabilised polycarbonate.

In one example, a face of the base that is in contact with the surface on which the solar thermal collector is placed is flat. In one example, a face of the base that is in contact with the surface on which the solar thermal collector is placed is pliable.

In one example, the base is generally square in shape.

In one example, the conduit is supported by a column which is attached to the base.

In one example, the column is located in the centre of the base. In one example, the column is offset from the centre of the base.

In one example, the column comprises a plurality of plates. In one example, one of more of the plurality of plates is triangular.

In one example, the column is a frame. In one example, the column is a cage structure.

In one example, one or more of the plurality of plates comprises fastening points for attaching the plurality of plates to each other. In one example, one or more of the plurality of plates comprises slots for connecting the plates to form the column.

In one example, the plates comprise guides for supporting the conduit. In one example, the plates comprise ridged edges. In one example, the plates comprise adhesive strips to adhere the conduit to the guides.

In one example, the ridged edges are downwardly sloping. In one example, the ridges edges are inwardly sloping.

In one example, the base comprises one or more base attachment formations. In one example, the one or more base attachment formations are aligned with each other. In one example, the one or more base attachment formations are aligned with the centre of the base. In one example, the one or more base attachment formations are displaced from the centre of the base.

In one example, the column comprises column attachment formations. In one example, the column attachment formations are complementary to the base attachment formations.

In one example, the conduit is flexible.

In one example, the conduit has a collapsible cross-section.

In one example, the conduit is boustrophedon or a coil. In one example, the conduit is helical. In one example, the face of the base facing the conduit is mirrored.

In one example, the face facing the conduit of at least one panel is mirrored.

In one example, the housing encloses the conduit. In one example, the housing hermetically seals the conduit from its surroundings.

In one example, the base comprises a plurality of sections. In one example, one or more of the plurality of sections comprises an interlocking mechanism. In one example, the interlocking mechanism is a magnetic mechanism.

In one example, the solar thermal collector further comprises an inlet port to supply fluid for circulation by the conduit and an outlet port to collect water that has been circulated by the conduit.

In one example, the conduit comprises a plastics material. In one example, the conduit comprises silicone.

In one example, the conduit comprises a plastic sleeve. In one example, the conduit comprises a plastic tube.

In one example, the base comprises aluminium. In one example, the base comprises a plastics material.

In one example, the panels comprise a plastics material. In one example, the panels comprise an acrylic material. In one example, the panels comprise PMMA. In one example, the panels comprise solar glass.

According to a second aspect, there is provided a system comprising a plurality of solar thermal collectors.

According to third aspect, there is provided a kit comprising a conduit configured to carry fluid and to absorb radiation, a base above which the conduit is mounted and a plurality of panels configured to interconnect with the base to produce a housing for the conduit for constructing the solar thermal collector.

According to a fourth aspect, there is provided a method of constructing a solar thermal collector, comprising assembling the kit.

BRIEF INTRODUCTION TO THE FIGURES

For a better understanding of the invention, and to show how embodiments of the same may be carried into effect, reference will now be made, by way of example, to the accompanying diagrammatic drawings in which.

DESCRIPTION OF EXAMPLE EMBODIMENTS

Figure 1:
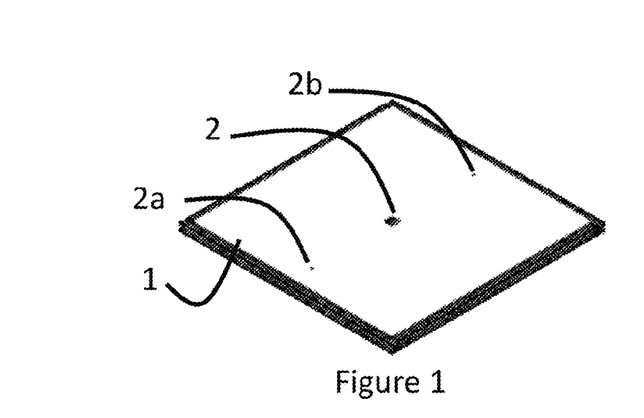
FIG. 1 shows a base for assembly into a solar thermal collector according to an example embodiment.

FIG. 1 shows a base 1 of a solar thermal collector according to an example embodiment. The base 1 shown in FIG. 1 is square. The base 1 comprises aluminium, so as to be durable yet relatively light-weight. Consequently, the base 1 can be easily transported and assembled at an installation site. The base 1 may include one or more base attachment formations 2, 2a, 2b to which a column can be attached. For example, FIG. 1 shows an base attachment formation 2a at the centre of the base 1 and two smaller base attachment formations 2a, 2b aligned in one direction but each equidistantly displaced in another from the central base attachment formation 2.

Figure 2:
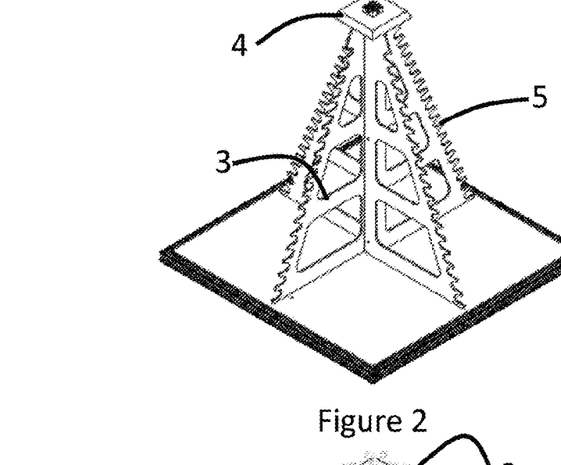
FIG. 2 shows a column of a solar thermal collector attached to the base of FIG. 1.

FIG. 2 shows a column 3 attached to the base 1 of the solar thermal collector by means of the base attachment formations 2, 2a, 2b. The column 3 includes column attachment formations (not shown) of complementary form or shape to the base attachment formations 2, 2a, 2b on the base 1, in order that the column 3 can be fixed to the base 1 without need for tools. The column 3 of FIG. 2 is shown as comprising four right angled triangular plates, where the edge of each triangular plate opposite the hypotenuse meets in the centre of the base 3.

Sections of the right-angled triangular plates comprising the column 3 have been cut out in FIG. 2. Cutting out these sections from the triangular plates that form the column 3 reduces the overall weight of solar thermal collector making it cheaper to transport, as well as allowing the solar thermal collector to be positioned on the roofs of buildings unable, for example, to support the greater weight of traditional solar thermal collectors.

The column 3 comprises guides 5 to support the conduit, the conduit being explained in more detail with reference to FIG. 4 below. For example, FIG. 2 shows the column 3 to comprise guides 5 in the form of ridged edges for helping to support and secure the conduit in place without the need for specialized tools. The guides 5 comprise downwardly and inwardly sloping surfaces, so that the conduit rests on them and against an inwardly arranged part of the column 3. In this way, the weight of the conduit helps to keep it in place in in the guides 5.

Figure 4:
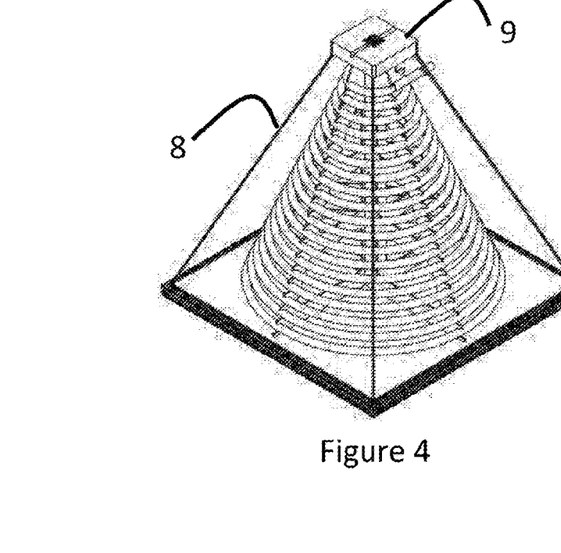
FIG. 4 shows the conduit of FIG. 3 housed by a housing to provide a solar thermal collector according to an example embodiment.

FIG. 2 also shows a first housing support plate 4 for supporting a housing, which is described in relation to FIG. 4, of the solar thermal collector. The first housing support plate shown in FIG. 2 is has a square cross section and a square opening through which the top of the column 3 protrudes. The geometry of the column 3, prevents the first housing support plate from sliding down the column 3. The outwardly facing faces of the first housing support plate 4 slope inwards and upwards to provide surfaces for supporting the housing.

Figure 3:
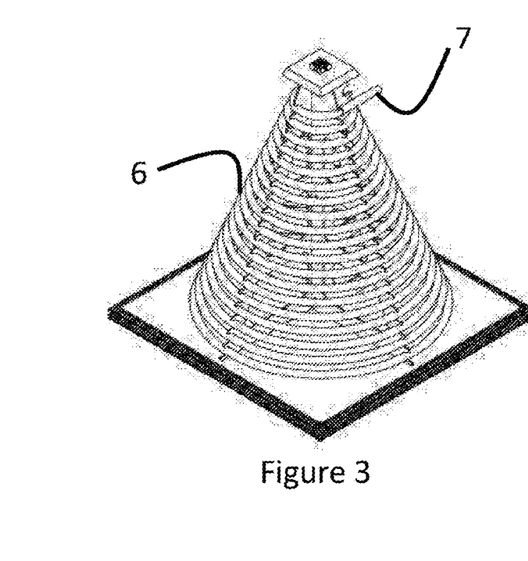
FIG. 3 shows a conduit of a solar thermal collector supported by the column of FIG. 2.

The conduit 6 is shown in FIG. 3. The conduit 6 of FIG. 3 is a tube for carrying fluid. FIG. 3 shows the conduit 6 as a coil. The conduit 6 comprises a plastics material, for instance, silicone, resulting in a light-weight and cheaply manufactured structure. The conduit 6 is flexible, allowing the coil shape to be formed, and allowing engagement with the guides 5. The conduit 6 has a compressible cross-section, so that it is easily folded and packaged and can be incorporated in a flat pack.

Due to a combination of seasonal variation and time of day, the solar angle will natural vary throughout its operation. Having a circular cross-section means that the conduit 6 is able to passively track the sun as the sun moves across the sky through a wide range of solar angles. Therefore, the solar thermal collector may be positioned without a great deal of accuracy without affecting its performance. A flat plate solar thermal collector, on the contrary, needs to be positioned facing the equator and at the correct tilt to minimise losses due to variation in solar angle.

Furthermore, the properties of flexibility and/or compressibility also result in improved resistance to damage caused by the freezing of the liquid in the conduit 6. For example, if the conduit 6 were made of metal and was carrying water, the water freezing, and consequently expanding, may rupture the conduit. Therefore, typical solar thermal collectors need to operate with glycol/antifreeze fluid to reduce the risk of fluid freezing in the conduit, adding cost and complexity to the system.

In addition to carrying a fluid, the conduit 6 absorbs solar radiation. This absorbed energy elevates the wall temperature of the conduit 6, which can be actively recovered by circulating a cooler fluid through it. At the bottom of the collector is an inlet port (not shown) into which cold water is delivered, for example by a pump. As the cold water makes its way to the top of the conduit 6, heat is transferred from the conduit wall to the fluid, yielding warm water at the top, which may be accessed via an outlet port 7.

FIG. 4 includes the housing 8 of the solar thermal collector. The housing 8 houses the conduit 6, being formed of a plurality of panels which interconnect with the base. Each of the plurality of panels rests on a face of the first housing support plate 4 described in FIG. 2. The inwardly and upwardly sloping faces of the first housing support plate each provides a surface on which each of the plurality of panels can rest. A second housing support plate 9, which is complementary in shape to the first housing support 4, caps the first housing support plate 4. By capping the first housing support plate 4, the second housing support plate 9 clasps the panels in place without the need for specialised tools to secure the housing 8. The second housing support plate 9 preferably comprises a transparent material so that radiation is not prevented from being incident on the conduit 6 by the second housing support plate 9.

The panels are transparent, so that radiation can transmit through the panels and elevate the wall temperature of the conduit 6 as described. By supporting the conduit 6 on the column 3, the surface area of the conduit 6 on which radiation transmitted through each of the panels is incident is increased compared with a conduit laid flat on the base 1. Consequently, the efficiency of the solar thermal collector is improved compared with a solar thermal collector in which a conduit is flat, without the need for more than one conduit.

The panels are made of a lightweight material, such as an acrylic. Again, use of a plastics material results in the solar thermal collector being light-weight and, thus, easily transportable and suitable for installation on edifices that may not be strong enough to support the weight of a traditional solar thermal panel. Moreover, compared with traditional solar thermal collectors, which use glass, the solar thermal collector of the present application is less susceptible to damage during transport to the installation site and thereafter The panels shown in FIG. 4 are substantially triangular, resulting in the housing 8, in combination with the base 1, having the shape of truncated square-based pyramid. The housing 8 may comprise, alternatively, triangular panels, such that the pyramid is not truncated.

The panels are configured to interconnect with each other and the base 1, enclosing the conduit 6 and trapping air around the conduit 6. This trapped air provides insulation and so reduces heat loss from the conduit 6 to the environment.

In order to improve the efficiency of the solar thermal collector, surfaces of the panels may be reflective. For example, the interior of one of the panels (i.e. a face of a panel facing the conduit 6) may be mirrored, meaning that, when light enters through a panel opposite the mirrored panel, light is reflected back towards the conduit 6. Similarly, the face of the base 1 facing the conduit 6 may be mirrored.

The geometry of the thermal solar thermal collector of the present application, as shown in FIG. 4, confers advantages over traditional solar thermal collectors, which have a planar geometry and require installation on a slope to function optimally. Firstly, the pyramidal geometry of the solar thermal collector allows it to be installed on the ground or any flat surface, such as a flat roof, without the need for additional mounting hardware, because the geometry of the housing 8, particularly the geometry of the housing 8 in combination with a coil conduit 6, allows the solar thermal collector to passively track the sun. Eliminating the need for additional mounting hardware reduces the cost and complexity of the system making it a viable technology in locations with poor infrastructure. The base 1 of the solar thermal collector shown in FIG. 4 could be readily adapted to allow installation on a sloped surface.

Furthermore, a solar thermal collector where the panels narrow from where they connect to the base 1 means that, as air is heated and rises to the top of the solar thermal collector, the surface area of the solar thermal collector reduces. Therefore, heat loss from the solar thermal collector to the surroundings is reduced.

Figure 5:
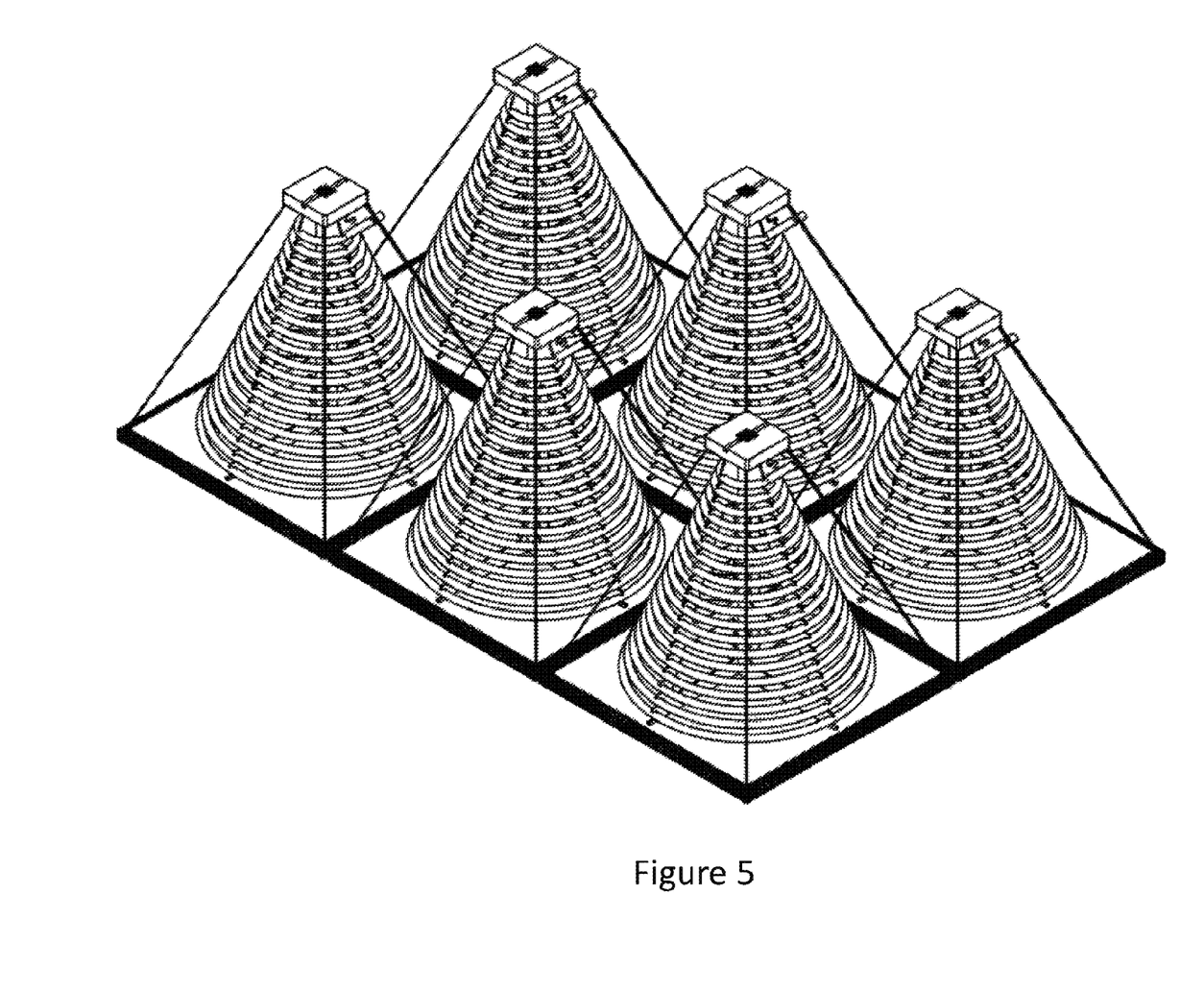
FIG. 5 shows a system comprising a plurality of solar thermal collectors according to an example embodiment.

The solar thermal collector of the present invention is highly modular, meaning that multiple solar thermal collectors can be combined to increase the thermal output for a particular application. For example, two or more solar thermal collectors can be added in series to increase thermal yield. In FIG. 5, six solar thermal collectors are combined. The solar thermal collectors may be combined to form a network, array, matrix, grid or complex or solar thermal collectors. The geometry of the base 1 and housing 8 may be adapted to ensure that any given solar thermal collector in the system of solar thermal collectors is not obscured by another.

Figure 6:
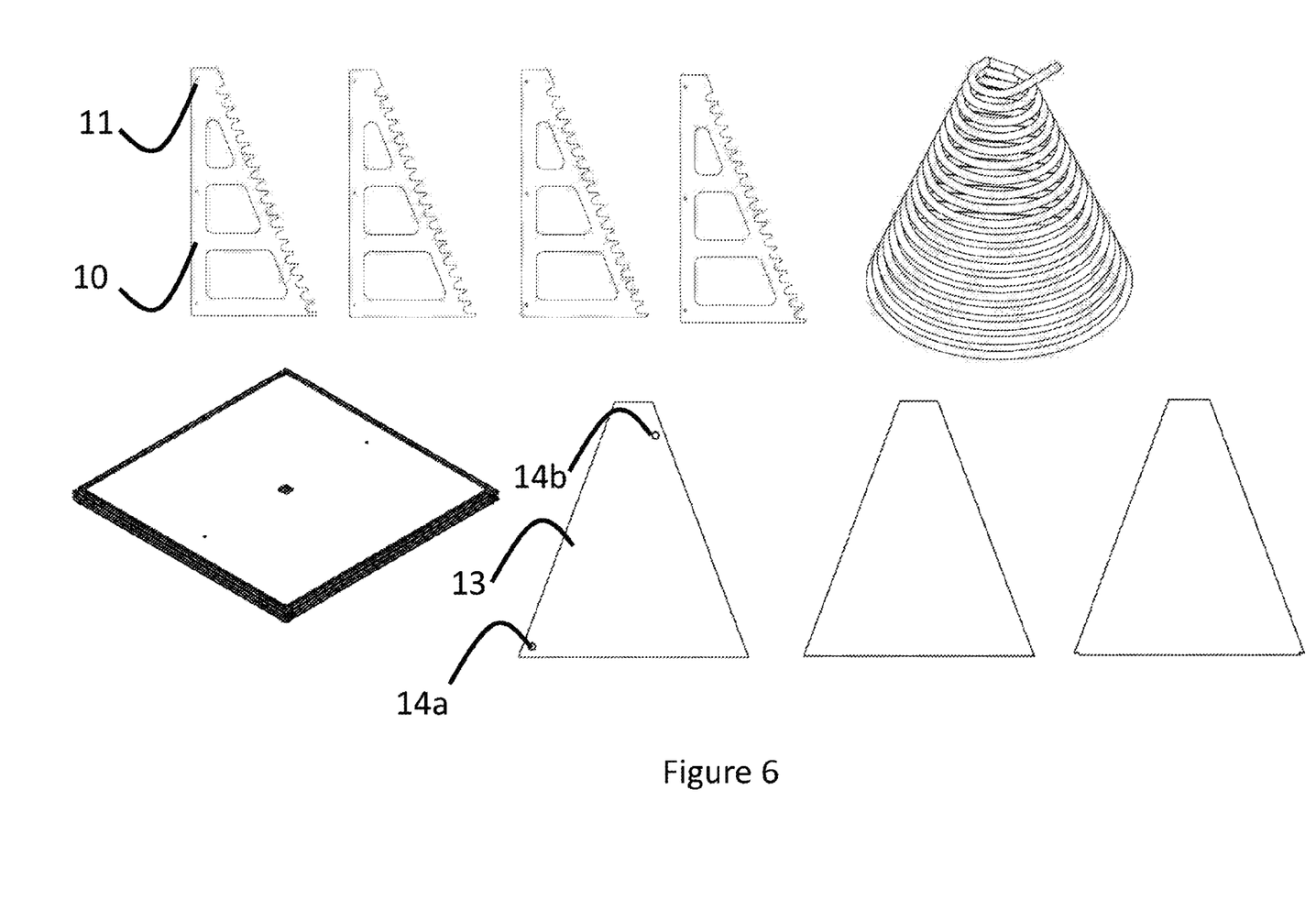
FIG. 6 shows a kit for constructing a solar thermal collector according to an example embodiment.

As shown in FIG. 6, the conduit 6, base 1 and panels described above may be provided as a kit, such as a flat pack kit. Therefore, the solar thermal collector may be constructed by assembling the components of the kit. It can be seen in Figure that the triangular plates 10 of which the column 3 is formed comprise fastening points 11 for attaching the triangular plates to each other to form the column. For example, in FIG. 6 the fastening points are openings through which a tie can be threaded in order to tie the triangular plates together. The fastening points 11 could also be used to attach the column to a column support for the column that could be attached to the base by the base attachment formations 2, 2a, 2b.

In FIG. 6, one of the panels 13 comprises an inlet port opening 14a and an outlet port opening 14b through which the inlet port and the outlet port may respectively be accessed.

Figure 7:
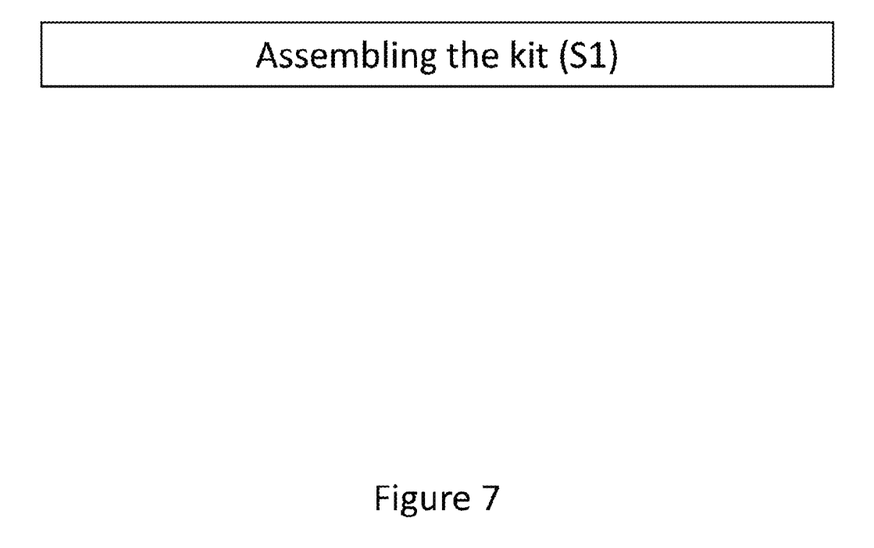
FIG. 7 shows the steps of a method for constructing a solar thermal collector according to an example embodiment.

FIG. 7 shows the step (S1) in the method of assembling the kit to construct the solar thermal collector. The step (S1) comprises assembling the kit. For example, the kit may be transported to the installation site in the form of a flat pack kit and installed there. As mentioned, the geometry of the solar thermal collector means that it can be installed on a flat surface.

The above described solar thermal collector can be used for a wide range of applications including residential and commercial heating. Specific examples include providing hot water for washing and cleaning in domestic and commercial contexts (the collector can be used to heat water to circa 45° C.), heating a building by providing hot water to a radiator and providing hot water for industrially processes (e.g. agriculture). Furthermore, because the solar thermal collector of the present application is low cost, light weight, flack packable and can does not require installation hardware, it is well-suited to use in remote locations such as temporary humanitarian situations.

Figure 8:
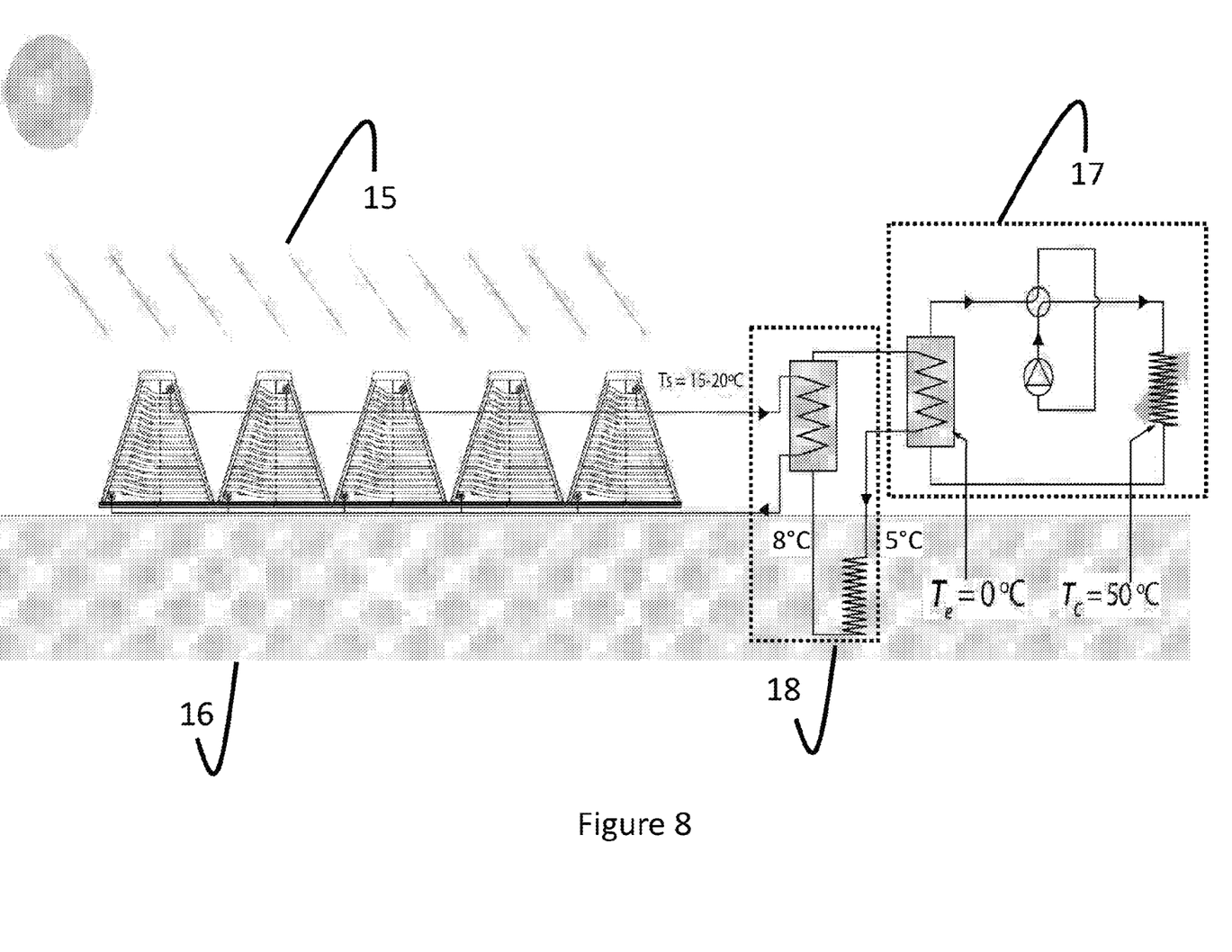
FIG. 8 shows a group of solar thermal collectors coupled with a geothermal heat pump according to an example embodiment.

One particular application of the solar thermal collector is shown in FIG. 8. In FIG. 8 a group of five solar thermal collectors, on which sunlight 15 is incident, is shown positioned in a row on a flat ground surface 16, coupled with a geothermal heat pump 17. As already described in relation to FIG. 5, multiple solar thermal collectors can be combined to increase thermal output.

A geothermal heat pump, sometimes also termed a ground source heat pump, is a heating system that transfers heat to and from the ground. In FIG. 7, fluid is carried by piping connected to the geothermal heat pump and in contact with the ground 16, such that heat transfer can occur between the ground 16 and the geothermal heat pump 17. Geothermal heat pumps require a certain temperature to be sustained in order to continue to operate. To this end, borehole heat exchangers are often used in conjunction with geothermal heat pumps, as the temperature under the ground is more stable than the temperature on the surface of the ground.

FIG. 7 shows a single borehole heat exchanger 18 connected to the group of solar thermal collectors. By connecting the geothermal heat pump 17 to the group of solar thermal collectors, the number of borehole heat exchangers can be reduced. In this case the number is reduced to one borehole heat exchanger 18. The number of borehole heat exchangers can be reduced, because the geothermal resource can be recharged over, for example, Summer by the solar thermal collectors such that the necessary temperature can be sustained for later use. For instance, FIG. 7 shows fluid in the of temperature $T_S$ between 15° C. and 20° C. being piped to the borehole heat exchanger 18 from the solar thermal collectors. Replacing borehole heat exchangers with solar thermal collectors is advantageous, as it its costly to dig boreholes. The cost, and high temperatures reached by conventional solar thermal collectors typically precludes their application in a system such as shown in FIG. 7.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A solar thermal collector adapted to be assembled from a flat pack configuration, the solar thermal collector comprising:
   a conduit configured to carry fluid and to absorb radiation;
   a base above which the conduit is mounted, the base having a central portion and an outer perimeter;
   a plurality of panels configured to interconnect with the base to produce a housing for the conduit; and
   a column attached to the base, the column supporting the conduit and comprising a plurality of plates projecting upward from the base, the plates each extending along the base in a direction from the outer perimeter of the base toward the central portion of the base;
   wherein each of the plurality of plates of the column has a first edge and a second edge, the first and second edges extending upwardly from the base, the first edge of each plate being engaged with at least one of the other plates of the plurality of plates and the second edge being free of engagement with any of the other plates of the plurality of plates.

2. The solar thermal collector of claim 1, wherein one or more of the panels is translucent or transparent.

3. The solar thermal collector of claim 1, wherein the panels narrow from where they connect to the base.

4. The solar thermal collector of claim 1, wherein the plurality of plates are each triangular in shape, the triangular plates comprising fastening points or slots for attaching the plurality of plates to each other.

5. The solar thermal collector of claim 1, wherein one or more of the panels are triangular.

6. The solar thermal collector of claim 1, wherein a face of the base that is in contact with the surface on which the solar thermal collector is placed is flat.

7. The solar thermal collector of claim 1 wherein the conduit is flexible.

8. The solar thermal collector of claim 1, wherein the conduit has a collapsible cross-section.

9. The solar thermal collector of claim 1, wherein the conduit is a coil.

10. The solar thermal collector of claim 1, wherein the face of the base facing the conduit is mirrored.

11. The solar thermal collector of claim 1, wherein the face facing the conduit of at least one panel is mirrored.

12. The solar thermal collector of claim 1, wherein the plurality of plates comprise four right angled triangular plates.

13. The solar thermal collector of claim 1, wherein the base comprises a plurality of sections.

14. The solar thermal collector of claim 1, comprising an inlet port to supply fluid for circulation by the conduit and an outlet port to collect water that has been circulated by the conduit.

15. The solar thermal collector of claim 1, wherein the conduit comprises a plastics material.

16. The solar thermal collector of claim 1, wherein at least one of:
   the base comprises a plastic material or aluminum; and
   the panels comprise a plastics material.

17. A system comprising a plurality of solar thermal collectors as claimed in claim 1.

18. A kit for constructing a solar thermal collector, the kit comprising:
   a conduit configured to carry fluid and to absorb radiation;
   a base above which the conduit is mounted; and
   a plurality of panels configured to interconnect with the base to produce a housing for the conduit; and a column configured to be attached to the base and to support the conduit, the column comprising a plurality of plates projecting upward from the base, each of the plurality of plates of the column has a first edge and a second edge, the first and second edges extending upwardly from the base, the first edge of each plate being engaged with at least one of the other plates of the plurality of plates and the second edge being free of engagement with any of the other plates of the plurality of plates.

19. A method of constructing a solar thermal collector, comprising assembling the kit of claim 18.

* * * * *